US010559195B2

(12) United States Patent
Sahara

(10) Patent No.: US 10,559,195 B2
(45) Date of Patent: Feb. 11, 2020

(54) FACILITY MANAGEMENT SYSTEM

(71) Applicant: JTEKT Corporation, Osaka-shi (JP)

(72) Inventor: Yuta Sahara, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/139,541

(22) Filed: Sep. 24, 2018

(65) Prior Publication Data

US 2019/0103016 A1 Apr. 4, 2019

(30) Foreign Application Priority Data

Sep. 29, 2017 (JP) .................................. 2017-191613

(51) Int. Cl.
*G08C 23/04* (2006.01)
*H04W 4/70* (2018.01)

(52) U.S. Cl.
CPC .............. *G08C 23/04* (2013.01); *H04W 4/70* (2018.02); *G08C 2201/12* (2013.01)

(58) Field of Classification Search
CPC ...... G08C 23/04; G08C 2201/12; H04W 4/70
See application file for complete search history.

(56) References Cited

U.S. PATENT DOCUMENTS

| 8,138,690 | B2* | 3/2012 | Chemel ................... F21V 17/02 |
| | | | 315/318 |
| 9,807,858 | B2* | 10/2017 | Recker ..................... H02J 9/02 |
| 2016/0308614 | A1* | 10/2016 | Tsonev ................. H04B 10/116 |
| 2018/0165955 | A1* | 6/2018 | Nakagawa ........... G05B 19/418 |
| 2019/0104600 | A1* | 4/2019 | Sahara ............... H05B 37/0272 |

FOREIGN PATENT DOCUMENTS

JP 2004-6291 1/2004

* cited by examiner

*Primary Examiner* — Mima M Shalaby
(74) *Attorney, Agent, or Firm* — Oblon, McClelland, Maier & Neustadt, L.L.P.

(57) ABSTRACT

In a facility management system, a controller that constitutes an information acquisition device attached to a signal light includes: a flashing detection operation execution section that executes flashing detection operation in which first cyclic operation is repeatedly performed a plurality of times consecutively, the first cyclic operation being defined as operation constituted of predetermined sampling operation to acquire light emission information through a sensor and first quiescent operation performed subsequent to the sampling operation, and having a cycle corresponding to a flashing cycle of the signal lamp, and a continuation processing section that repeats second cyclic operation a plurality of times consecutively, the second cyclic operation being defined as operation constituted of the flashing detection operation and second quiescent operation performed subsequent to the flashing detection operation and having a time that is longer than a time of the first quiescent operation.

9 Claims, 12 Drawing Sheets

FACILITY MANAGEMENT SYSTEM

INCORPORATION BY REFERENCE

The disclosure of Japanese Patent Application No. 2017-191613 filed on Sep. 29, 2017 including the specification, drawings and abstract, is incorporated herein by reference in its entirety.

BACKGROUND OF THE INVENTION

1. Field of the Invention

The present invention relates to a facility management system.

2. Description of the Related Art

In a production line or like in which the status of operation of a processing facility can be transmitted from the processing facility to a management device, a worker or a manager can easily grasp the status of operation to improve the production efficiency as a result. In order to transmit the status of operation of the existing processing facility to the management device, however, it is necessary to change the setting of the existing control device or add a new control device thereto. The setting of the existing control device is changed by changing software (such as a ladder circuit) of a controller (such as a PLC) of the existing processing facility, for example. A new control device is added by adding a relay component for taking in an input signal to the PLC. This increases the cost and the number of man-hours.

Japanese Patent Application Publication No. 2004-6291 (JP 2004-6291 A) describes a device provided to a signal lamp mounted to the existing processing facility to allow transmission of the status of operation of the existing processing facility from the existing processing facility to a management device. That is, this device detects a signal lamp that emits light in accordance with the status of operation of the existing processing facility, and transmits a detection signal to the outside through a wireless device. This device eliminates the need to change the setting of the existing control device or add a new control device.

The signal lamp is occasionally flashed in order to display the state of the processing facility. It is necessary to shorten the sampling cycle of a sensor in order to detect the flashing state. Shortening the sampling cycle increases the amount of power consumption by the sensor, a controller, or the like. For a device that includes a build-in power source, in particular, it is desired to reduce the amount of power consumption in order to extend the life cycle of the dedicated power source.

SUMMARY OF THE INVENTION

It is an object of the present invention to provide a facility management system that allows detection of flashing while reducing the amount of power consumption.

An aspect of the present invention provides a facility management system including:
  a processing facility;
  a signal lamp that indicates information on the processing facility;
  an information acquisition device that is attached to the signal lamp, that acquires light emission information on the signal lamp, and that wirelessly transmits the light emission information; and
  a management device that wirelessly receives the light emission information which is transmitted by the information acquisition device, that determines on the basis of the light emission information which of a continuous light-on state, a flashing state, and a continuous light-off state the signal lamp is in, and that manages a state of the processing facility.

The information acquisition device includes a sensor that acquires the light emission information and a controller that controls the sensor. The controller includes: a flashing detection operation execution section that executes flashing detection operation in which first cyclic operation is repeatedly performed a plurality of times consecutively, the first cyclic operation being defined as operation constituted of predetermined sampling operation to acquire the light emission information through the sensor and first quiescent operation performed subsequent to the sampling operation, and having a cycle corresponding to a flashing cycle of the signal lamp; and a continuation processing section that repeats second cyclic operation a plurality of times consecutively, the second cyclic operation being defined as operation constituted of the flashing detection operation and second quiescent operation performed subsequent to the flashing detection operation and having a time that is longer than a time of the first quiescent operation.

The management device determines on the basis of the light emission information which is acquired in each flashing detection operation whether or not the signal lamp is in the flashing state, and cyclically determines whether or not the signal lamp is in the flashing state with the continuation processing section cyclically executing the second cyclic operation.

With the facility management system, in order to determine a flashing state, the sampling operation to acquire light emission information on the signal light is not performed consecutively, but the first cyclic operation which is constituted of the predetermined sampling operation and the first quiescent operation is performed a plurality of times. That is, a flashing state can be determined through the plurality of sampling operations in the first cyclic operation. The first cyclic operation includes the first quiescent operation. That is, the amount of power consumption can be reduced for the first quiescent operation compared to a case where the sampling operation is performed consecutively as in the related art.

Further, the second quiescent operation is performed after the first cyclic operation is performed a plurality of times consecutively. That is, a flashing state is not determined at all times, but is determined intermittently with the second quiescent operation interposed therebetween. Further, the second quiescent operation is longer than the first quiescent operation. Thus, the amount of power consumption can be further reduced for the second quiescent operation.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
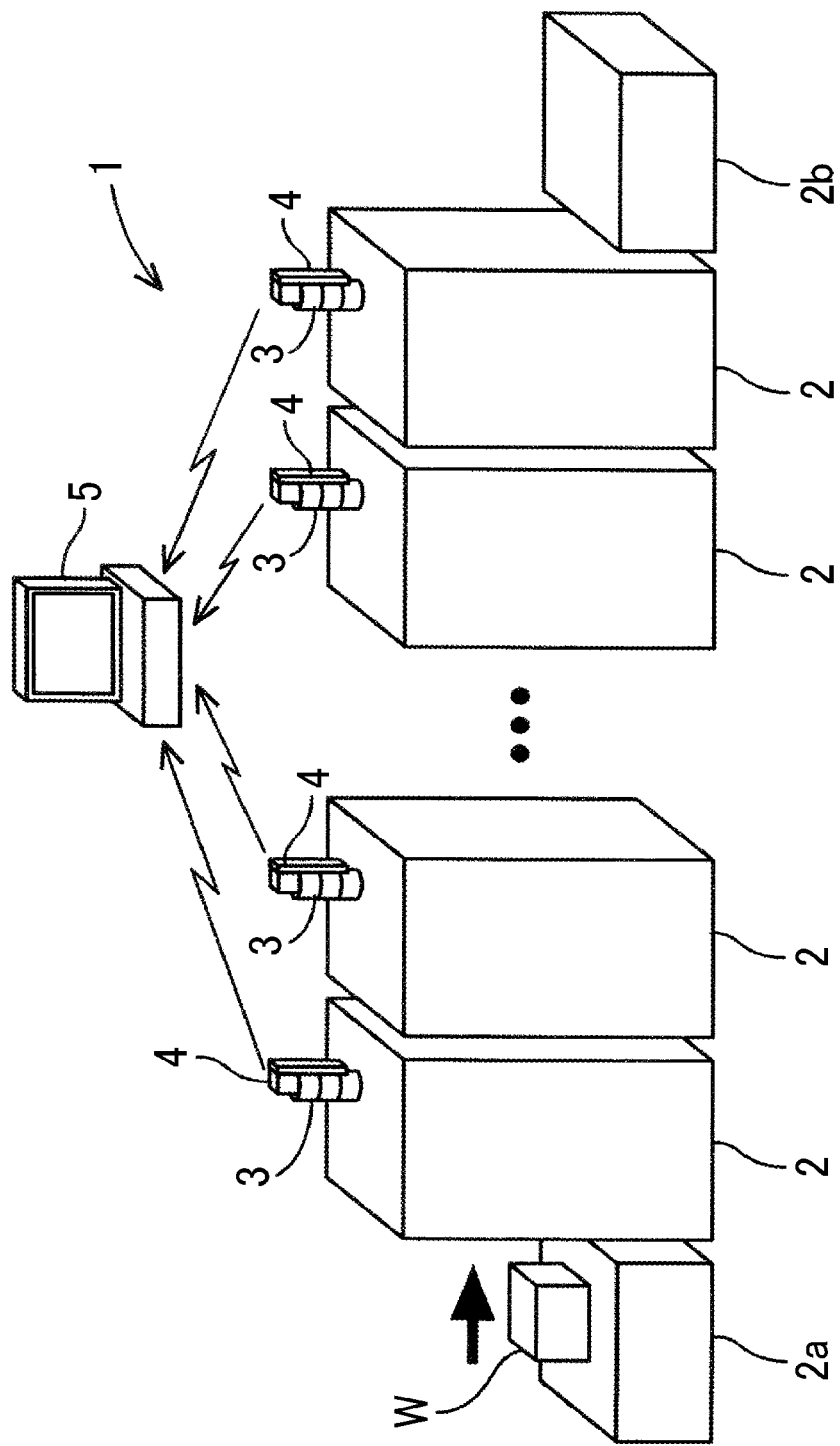
FIG. 1 illustrates the overall configuration of a facility management system.

A facility management system 1 will be described with reference to FIG. 1. The facility management system 1 includes a plurality of processing facilities 2, and manages the state of the plurality of processing facilities 2. As illustrated in FIG. 1, the facility management system 1 includes a plurality of processing facilities 2, a plurality of signal lamps 3, a plurality of information acquisition devices 4, and a management device 5.

Examples of the processing facilities 2 include a production device that processes, assembles, etc. a workpiece W, a conveyance device that conveys the workpiece W, an inspection device that inspects the workpiece W, and so forth. Examples of the processing include cutting, plastic working, quenching, and so forth. In FIG. 1, a plurality of machine tools that cut and grind the workpiece W while conveying the workpiece W are illustrated as the plurality of processing facilities 2, and a production line that includes the plurality of machine tools is illustrated. That is, the plurality of processing facilities 2 which serve as machine tools are arranged in the production line, sequentially process the workpiece W as a material carried in from a carry-in device 2a, and carry out the workpiece W after being processed from a carry-out device 2b.

For example, the processing facility 2 which is arranged at a first position in the production line checks whether or not the workpiece W as a material is carried into the carry-in device 2a. In the case where the workpiece W is not carried in, it is necessary for a worker to prepare the workpiece W. The processing facilities 2 which are arranged at second and subsequent positions do not perform such checking.

The plurality of signal lamps 3 are attached to the plurality of processing facilities 2, respectively. The signal lamps 3 are provided on the top plate of the processing facilities 2 so as to be visually recognizable by a worker and a manager from a distance. The signal lamps 3 indicate information on the processing facilities 2, to which the signal lamps 3 are attached, through light emission. The signal lamps 3 are configured to be able to emit light in a plurality of colors. For example, the signal lamps 3 are each constituted by stacking three translucent plastic cases in a hollow cylindrical shape and placing a light source such as an LED inside each of the plastic cases. The plastic cases are lit up and flashed in red, yellow, and green sequentially from the upper level, for example. It should be noted, however, that the signal lamps 3 are not limited to having three colors, and may have fewer colors such as one or two colors, or may have more colors such as four or five colors. The display colors may be a variety of colors other than red, yellow, and green.

The signal lamp 3 indicates that the processing facility 2 is operating abnormally when the signal lamp 3 is continuously lit up in red, indicates that the processing facility 2 needs maintenance when the signal lamp 3 is continuously lit up in yellow, and indicates that the processing facility 2 is operating normally when the signal lamp 3 is continuously lit up in green. The signal lamp 3 indicates that the workpiece W has not been carried into the carry-in device 2a, which is positioned immediately before the processing facility 2, when the signal lamp 3 is flashed in red. The target of light-on and flashing is changeable as appropriate through setting. For example, the signal lamp 3 may be configured not to be flashed, depending on the processing facility 2.

The plurality of information acquisition devices 4 are attached to the plurality of signal lamps 3, respectively. The information acquisition devices 4 can each acquire light emission information on the signal lamp 3 to which the information acquisition device 4 is attached, and wirelessly transmit the acquired light emission information.

The management device 5 wirelessly receives the light emission information which is transmitted by each of the plurality of information acquisition devices 4. The management device 5 determines, on the basis of the light emission information, which of a continuous light-on state, a flashing state, and a continuous light-off state each of the plurality of signal lamps 3 is in. The management device 5 manages the state of the plurality of processing facilities 2. The management device 5 displays the overall operating status of the plurality of processing facilities 2 on the basis of the received light emission information in a visually recognizable manner using a graph, a diagram, or the like.

The management device 5 is installed in a management office of a factory in which the production line is installed, for example, and is viewable by the manager or the worker. That is, the manager or the worker can grasp the state of the plurality of processing facilities 2 by checking the management device 5. Besides the above, the management device 5 may also be implemented as a wearable terminal, for example. In this case, the manager or the worker can grasp the state of the plurality of processing facilities 2 while moving.

Figure 2A:
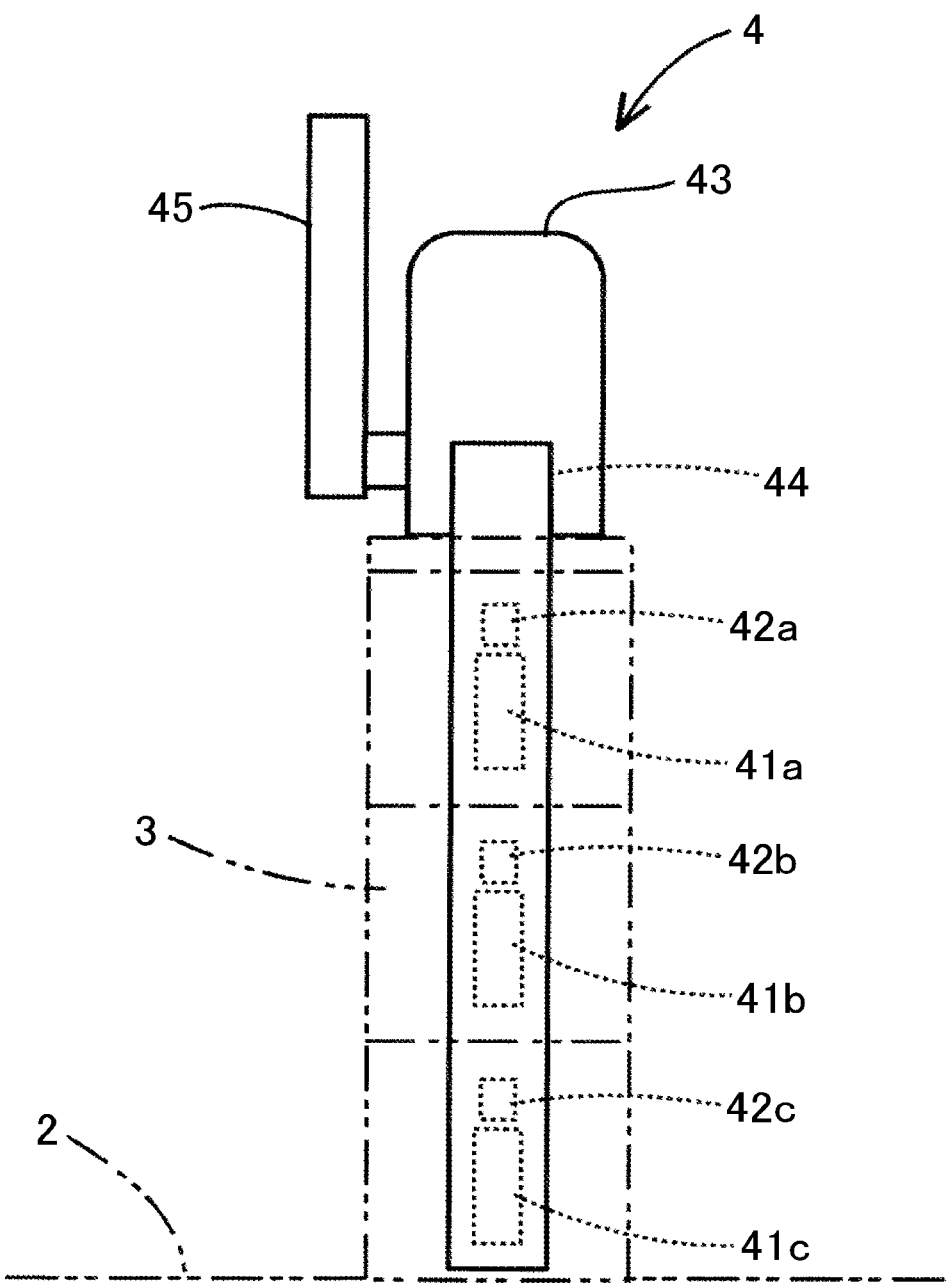
FIG. 2A is an enlarged front view of an information acquisition device.
Figure 2B:
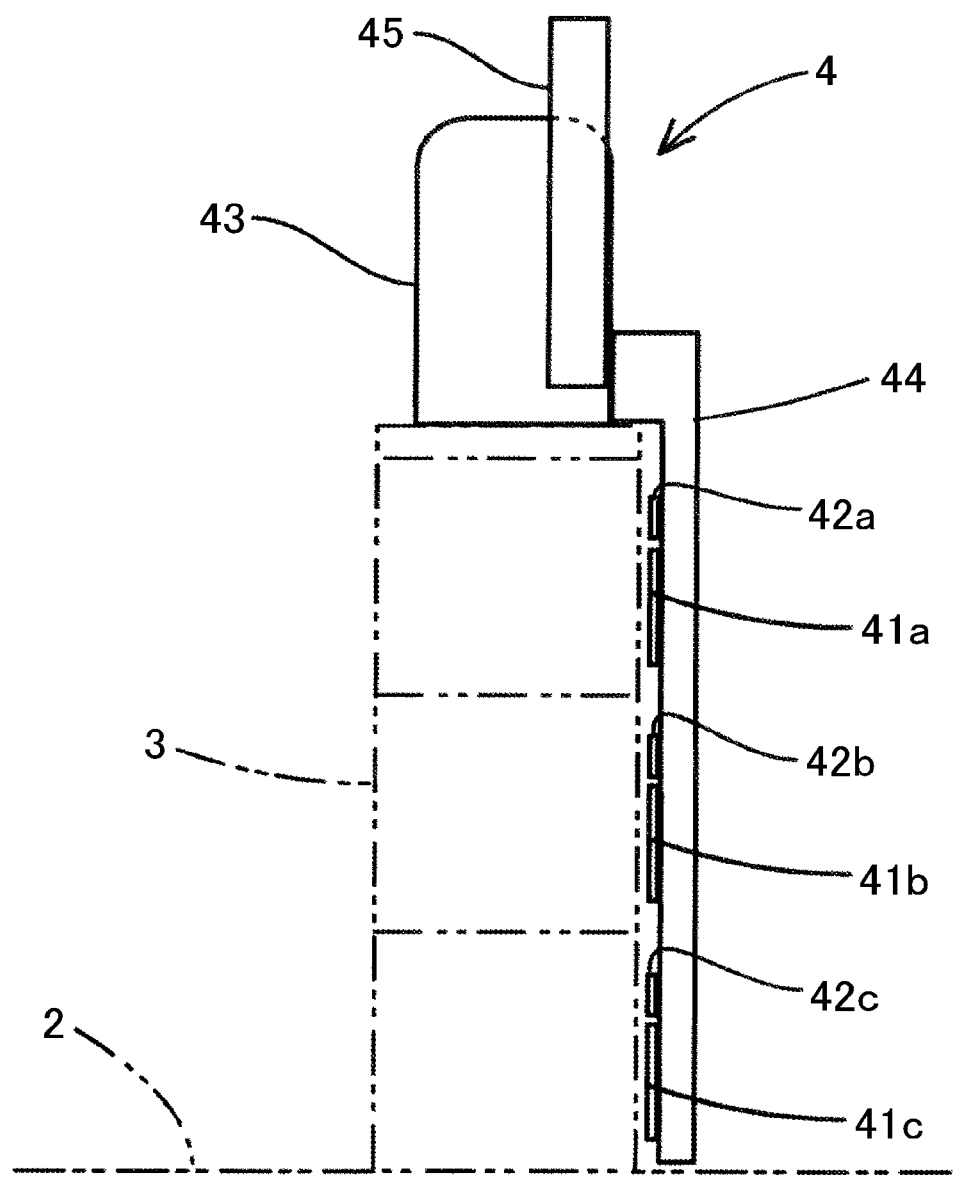
FIG. 2B is an enlarged left side view of the information acquisition device.

The configuration of the information acquisition device 4 will be described with reference to FIGS. 2A and 2B. The information acquisition device 4 includes three sensors 41a, 41b, and 41c, three power generation devices 42a, 42b, and 42c, a device body 43, a flexible wiring substrate 44, and an antenna 45.

The three sensors 41a, 41b, and 41c are disposed at positions corresponding to the respective light sources of the signal lamp 3. The three sensors 41a, 41b, and 41c detect a physical quantity related to the brightness of light from the respective light sources. Examples of the physical quantity related to the brightness include illuminance (luminous flux (lux (lx)) that is incident per unit area (1 m$^2$)), luminous flux (amount of light (lumen (lm)) transmitted per unit time), luminous intensity, and luminance. The three sensors 41a, 41b, and 41c may each be a photodiode that outputs a light detection signal at 0 V to 2 V (which varies in accordance with the amount of light or the luminous flux), for example.

The three power generation devices 42a, 42b, and 42c are disposed at positions corresponding to the respective light sources of the signal lamp 3 and in the vicinity of the three sensors 41a, 41b, and 41c, respectively. The three power generation devices 42a, 42b, and 42c generate power by light from the respective light sources of the signal lamp 3. The three power generation devices 42a, 42b, and 42c are each a solar cell of a crystal silicon type, for example.

The device body 43 is attached to the upper end of the signal lamp 3, and electrically connected to the three sensors 41a, 41b, and 41c and the three power generation devices 42a, 42b, and 42c. The device body 43 includes a power source, and controls acquisition of light emission information on the light sources of the signal lamp 3 by the three sensors 41a, 41b, and 41c. The device body 43 further controls power generation by the three power generation devices 42a, 42b, and 42c and wireless transmission of various kinds of information.

The flexible wiring substrate 44 is connected to a side of the device body 43, and provided to extend downward along the signal lamp 3. That is, the flexible wiring substrate 44 is disposed so as to face the light sources of the signal lamp 3. The three sensors 41a, 41b, and 41c and the three power generation devices 42a, 42b, and 42c discussed above are attached to the flexible wiring substrate 44. The antenna 45 is attached to the device body 43.

The circuit configuration of the information acquisition device 4 will be described with reference to FIG. 3. As discussed above, the information acquisition device 4 includes the device body 43. The device body 43 is electrically connected to the three sensors 41a, 41b, and 41c, the three power generation devices 42a, 42b, and 42c, and the antenna 45.

Figure 3:
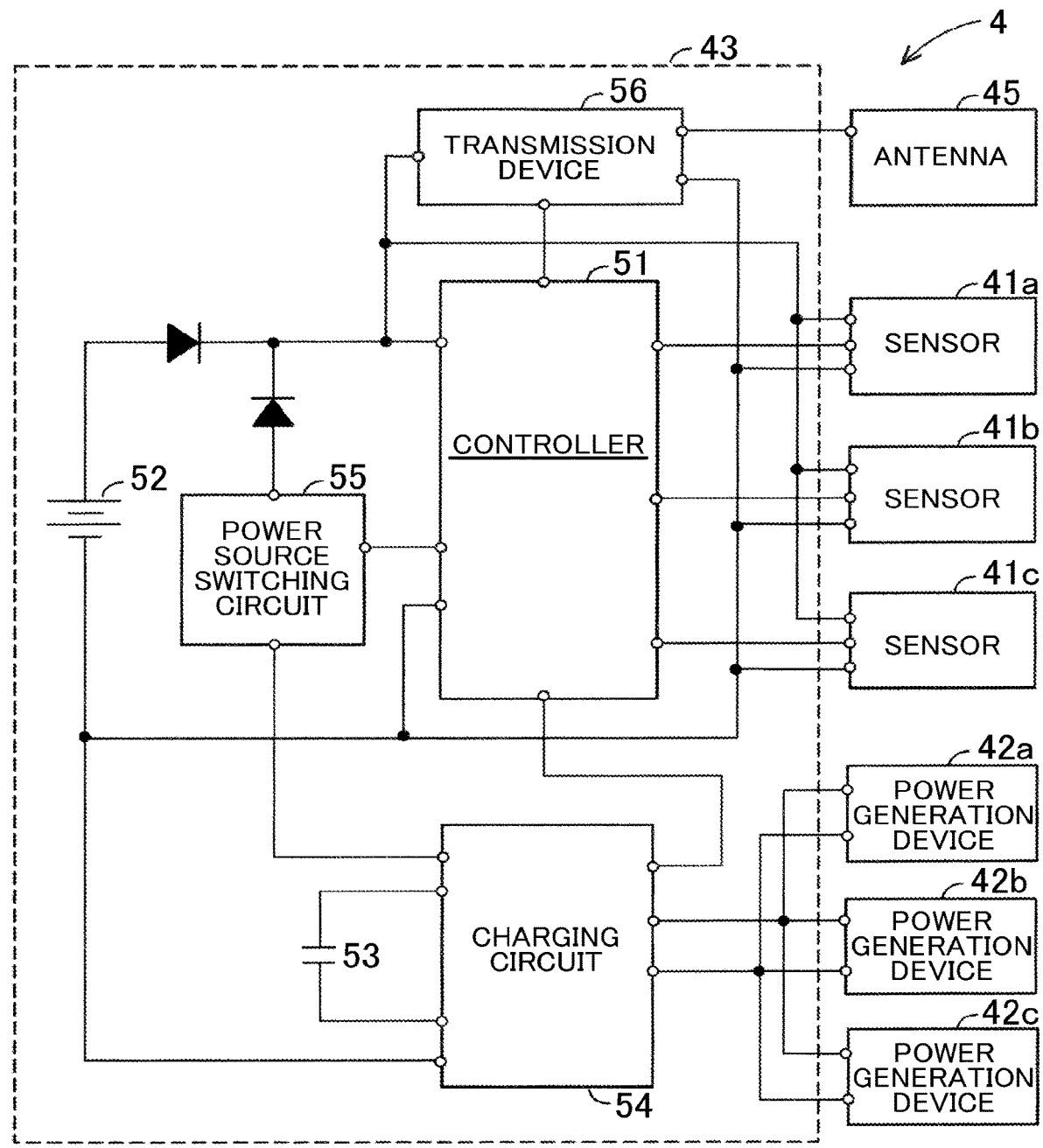
FIG. 3 illustrates the circuit configuration of the information acquisition device.

As illustrated in FIG. 3, the device body 43 includes a controller 51, a first power source 52, a second power source 53, a charging circuit 54, a power source switching circuit 55, and a transmission device 56. The controller 51 is constituted of a central processing unit (CPU), for example. The controller 51 executes control of acquisition of light emission information by the three sensors 41a, 41b, and 41c, control of transmission of the light emission information, acquisition of voltage monitor information on the second power source 53 from the charging circuit 54, control of output of High/Low signals to the power source switching circuit, and so forth.

The first power source 52 serves as a main power source, and is a chargeable dry battery, for example, such as a replaceable battery, for example. The second power source 53 serves as an auxiliary power source, and has a role of supplementing the first power source 52 which serves as a main power source. It should be noted, however, that the second power source 53 may serve as a main power source and the first power source 52 may serve as an auxiliary power source. The second power source 53 is constituted of a capacitor. The second power source 53 is charged by the charging circuit 54 with power generated by the three power generation devices 42a, 42b, and 42c.

The charging circuit 54 executes control of power generation by the three power generation devices 42a, 42b, and 42c, acquires the generated power, and charges the second power source 53 with the acquired power. The charging circuit 54 further outputs voltage monitor information on the second power source 53 to the controller 51.

The power source switching circuit 55 switches through the controller 51 between a state in which power of the second power source 53 is output and a state in which power of the second power source 53 is not output. In the case where the voltage monitor information which is acquired from the charging circuit 54 is less than a predetermined value, the controller 51 outputs a High signal. In this case, the power source switching circuit 55 switches to the state in which power of the second power source 53 is output. That is, in the case where the voltage of the second power source 53 is low, the first power source 52 supplies power. In the case where the acquired voltage monitor information is not less than the predetermined value, on the other hand, the controller 51 outputs a Low signal. In this case, the power source switching circuit 55 switches to the state in which power of the second power source 53 is not output. In this event, the second power source 53 is only charged.

The transmission device 56 wirelessly transmits the light emission information which is acquired by the three sensors 41a, 41b, and 41c via the antenna 45 in the case where an instruction for a transmission process is provided from the controller 51.

The functions of the information acquisition device 4 and the management device 5 will be described with reference to FIGS. 4 to 10. The function of the controller 51 of the information acquisition device 4 related to acquisition and transmission of light emission information will be mainly described.

The information acquisition device 4 includes an acquisition section 61, a continuation processing section 62, a transmission processing section 63, a flashing necessity determination section 64, and a power type determination section 65. The acquisition section 61 executes control for causing the sensors 41a, 41b, and 41c to acquire light emission information, and performs a process of storing the acquired light emission information.

As illustrated in FIGS. 5 to 8, the acquisition section 61 acquires light emission information in four modes, namely an alternating current (AC) flashing detection mode A, an AC light-on detection mode B, a direct current (DC) flashing detection mode C, and a DC light-on detection mode D.

Figure 5:
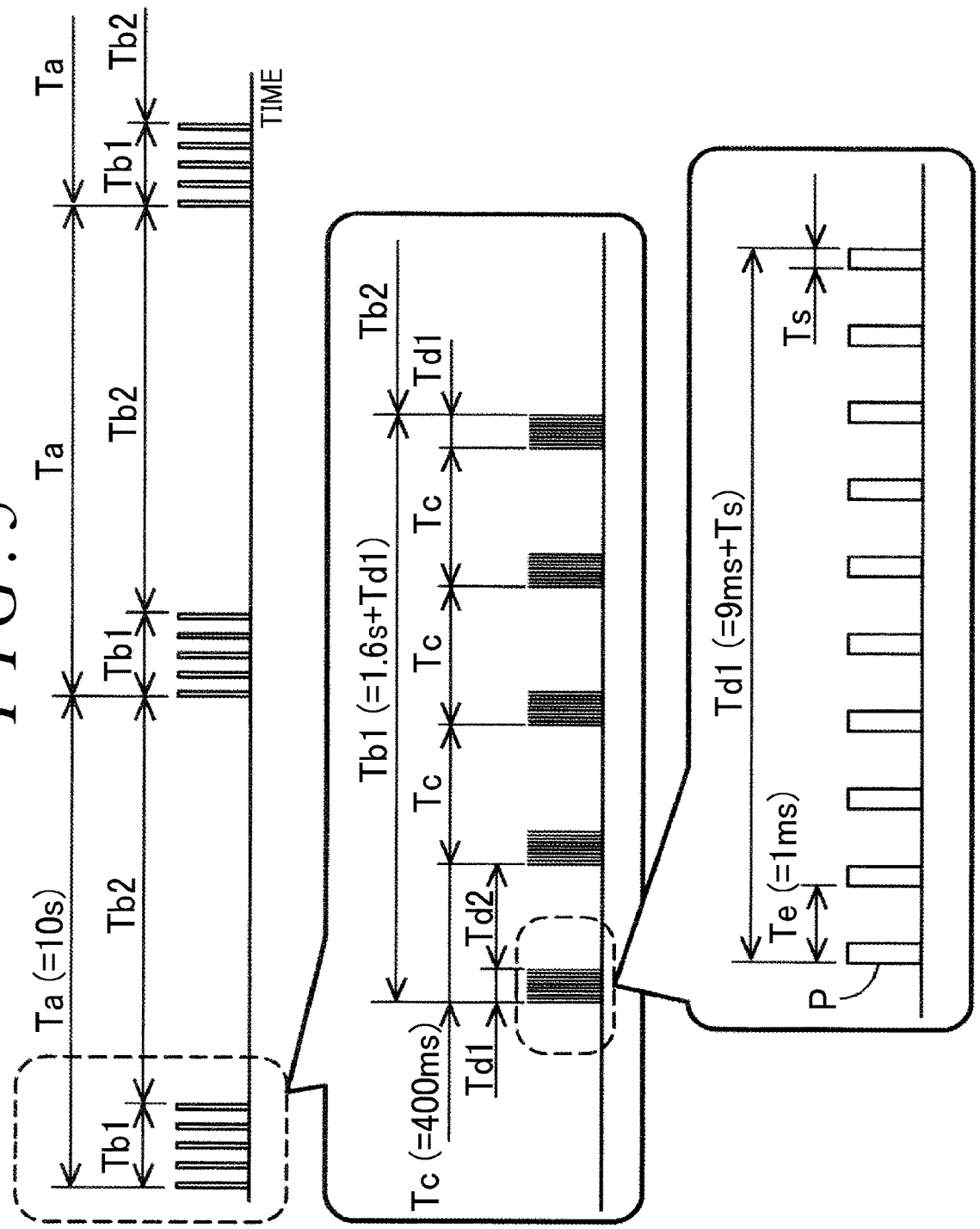
FIG. 5 is a timing chart illustrating an alternating current (AC) flashing detection mode A.
Figure 6:
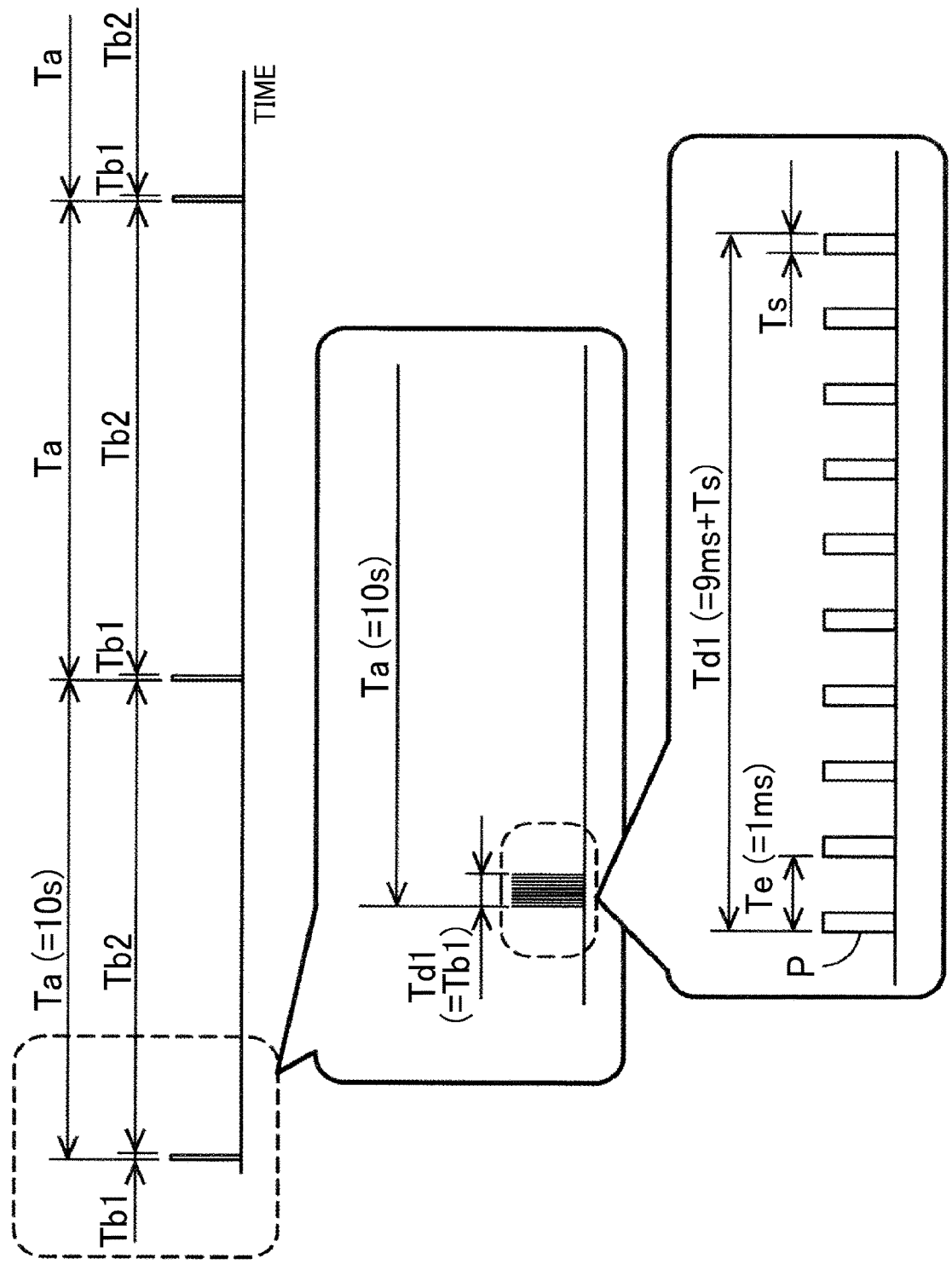
FIG. 6 is a timing chart illustrating an AC light-on detection mode B.

In the AC flashing detection mode A, as illustrated in FIG. 5, the type of power supplied to the signal lamp 3 is AC power, and the signal lamp 3 can be detected to be in any of the continuous light-on state, the flashing state, and the continuous light-off state. In the AC light-on detection mode B, as illustrated in FIG. 6, the type of power supplied to the signal lamp 3 is AC power, and the signal lamp 3 can be detected to be in any of the continuous light-on state and the continuous light-off state. That is, the signal lamp 3 cannot be detected to be in the flashing state in the AC light-on detection mode B.

Figure 7:
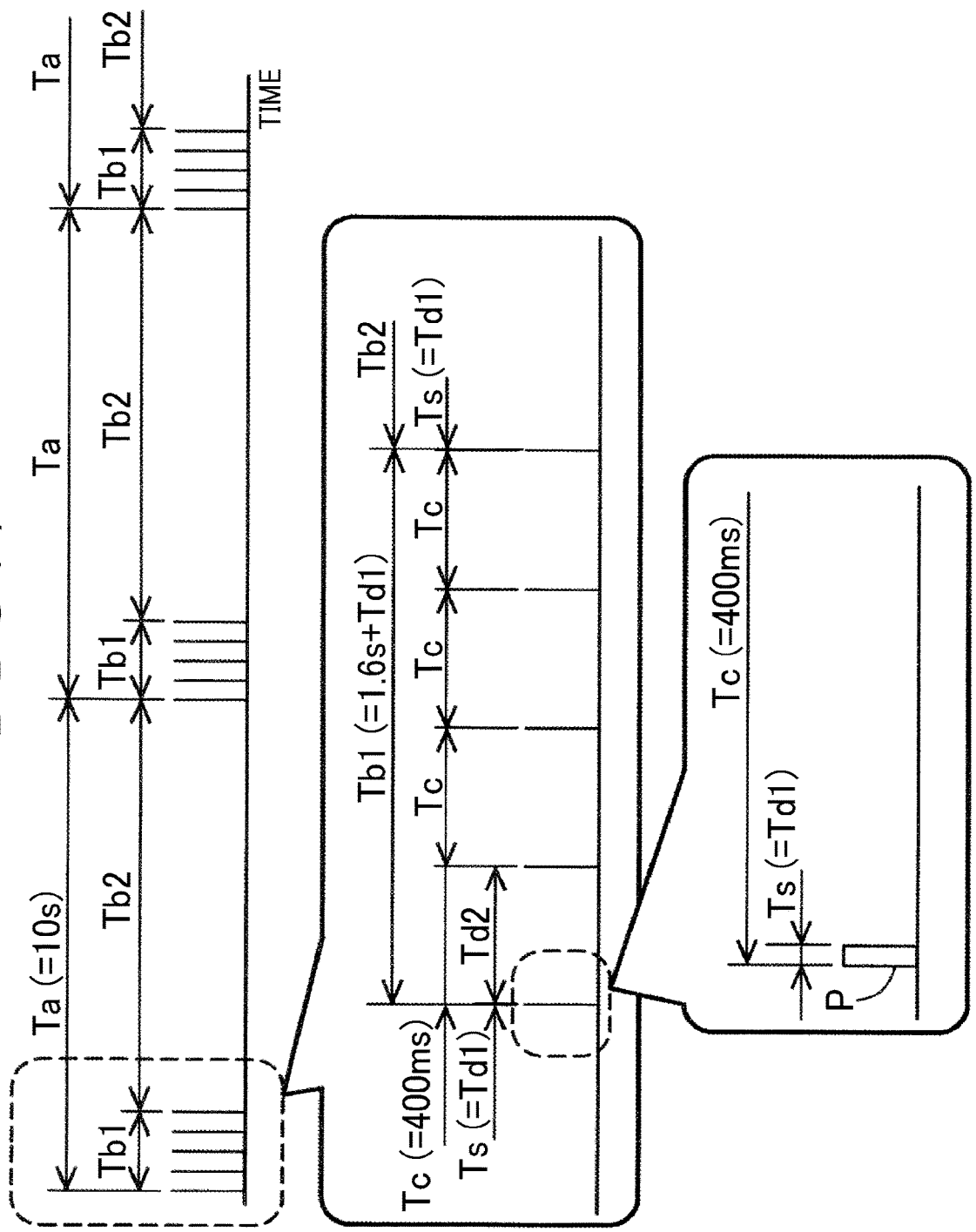
FIG. 7 is a timing chart illustrating a direct current (DC) flashing detection mode C.
Figure 8:
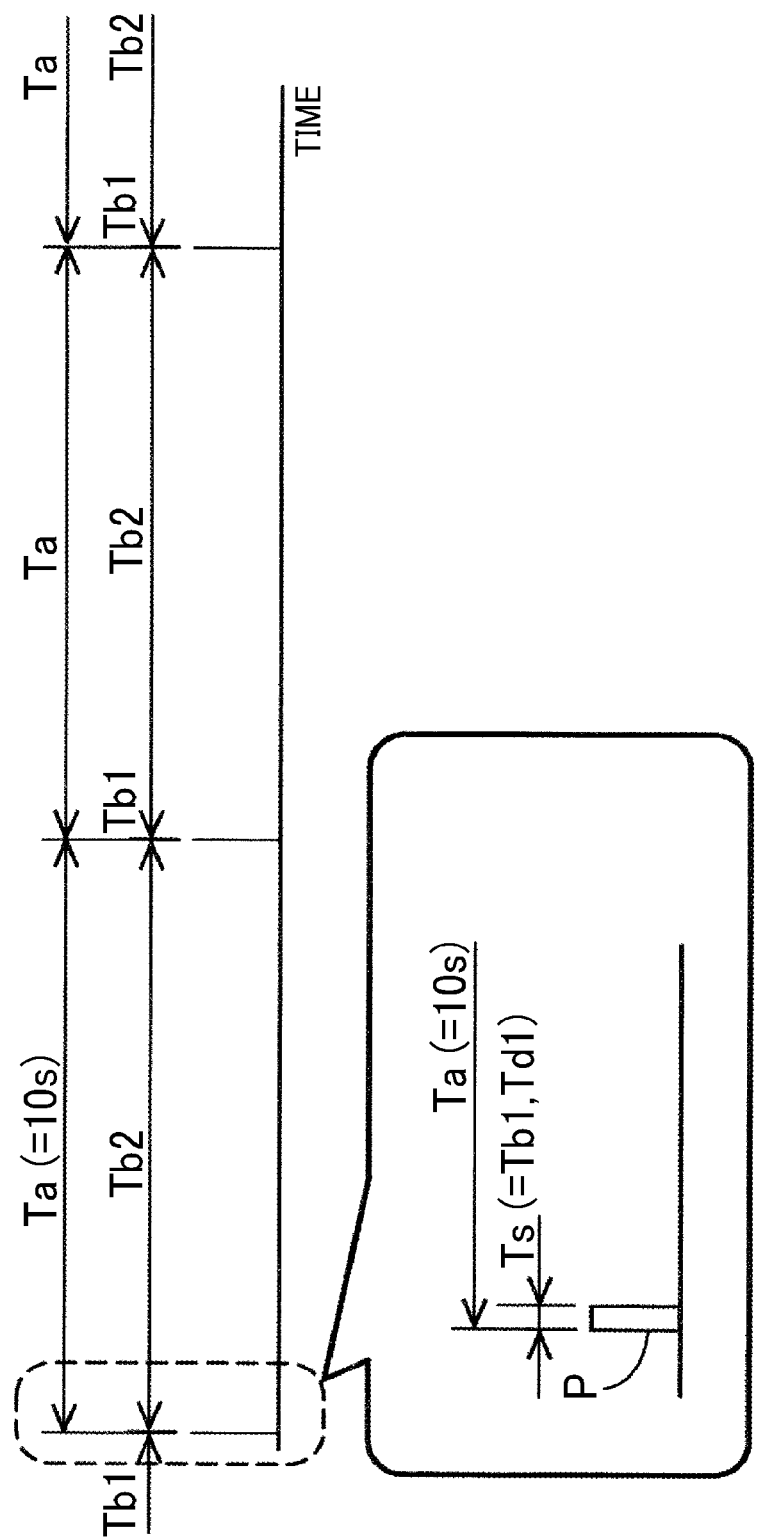
FIG. 8 is a timing chart illustrating a DC light-on detection mode D.

In the DC flashing detection mode C, as illustrated in FIG. 7, the type of power supplied to the signal lamp 3 is DC power, and the signal lamp 3 can be detected to be in any of the continuous light-on state, the flashing state, and the continuous light-off state. In the DC light-on detection mode D, as illustrated in FIG. 8, the type of power supplied to the signal lamp 3 is DC power, and the signal lamp 3 can be detected to be in any of the continuous light-on state and the continuous light-off state. That is, the signal lamp 3 cannot be detected to be in the flashing state in the DC light-on detection mode D.

The type of power supplied to the signal lamp 3 differs as appropriate in accordance with the manner of use. That is, the information acquisition device 4 is initially set to be able to detect all of the continuous light-on state, the flashing state, and the continuous light-off state whether the power type is AC power or DC power.

Next, the AC flashing detection mode A will be described in detail with reference to FIG. 5. In the AC flashing detection mode A, as illustrated in FIG. 5, first cyclic operation Tc constituted of sampling operation Td1 and first quiescent operation Td2 is executed. The first cyclic operation Tc has a cycle corresponding to the flashing cycle of the signal lamp 3.

In the sampling operation Td1 in the first cyclic operation Tc, light emission information is acquired by the sensors 41a, 41b, and 41c. In the first quiescent operation Td2 in the first cyclic operation Tc, which is performed subsequent to the sampling operation Td1, acquisition operation is not performed. In the first quiescent operation Td2, the controller 51 enters a so-called sleep mode or hibernation mode after a transmission process, which reduces power consumption by the controller 51.

AC power is varied over time, and therefore a detection value of the light emission information is also fluctuated in accordance with fluctuations in AC power. Therefore, it is necessary that the peak value of the detection value of the light emission information should be acquired in the sampling operation Td1 even if the detection value is fluctuated along with fluctuations in AC power. Thus, the sampling operation Td1 has a time corresponding to half the cycle of the AC power, and a plurality of sampling processes P are performed in the time. That is, one of the plurality of sampling processes P corresponds to a value around the peak value of the AC power.

For example, in the case of AC power at 50 Hz, half the cycle corresponds to 10 ms, and the time of the sampling operation Td1 may be a time around half the cycle. One sampling process P requires a time Ts. A cycle Te of the sampling process P which is performed in the sampling operation Td1 is 1 ms, for example. In this case, ten sampling processes P are executed at an interval of 1 ms in one sampling operation Td1. Thus, one sampling operation Td1 corresponds to a total of nine cycles Te (9 ms) of the sampling process P and the time Ts which is required for one sampling process P. It should be noted, however, that the number and the cycle of the sampling processes P in one sampling operation Td1 can be changed as appropriate.

The first cyclic operation Tc described above is performed repeatedly a plurality of number of times consecutively as state detection operation Tb1 for the signal lamp 3 in the AC flashing detection mode A. In FIG. 5, the first cyclic operation Tc is repeatedly performed five times consecutively in the state detection operation Tb1. For example, in the AC flashing detection mode A, the first cyclic operation Tc corresponds to 400 ms, and the state detection operation Tb1 corresponds to 1.6 s+Td1 (=400 ms×4 times+Td1). The state detection operation Tb1 in the AC flashing detection mode A is referred to as "AC flashing detection operation".

The time (400 ms) of one first cyclic operation Tc corresponds to the minimum value of the flashing cycle in the case where the signal lamp 3 is in the flashing state. On the other hand, the time (1.6 s+Td1) of one state detection operation (AC flashing detection operation) Tb1 is determined on the basis of the maximum value of the flashing cycle in the case where the signal lamp 3 is in the flashing state. For example, the time (1.6 s+Td1) of one state detection operation Tb1 corresponds to half the maximum value of the flashing cycle. That is, the range in which the flashing cycle is 400 ms to about 1 s is to be detected.

The determination as to whether the signal lamp 3 is in the flashing state is made on the basis of the number of variations from light-on to light-off and the number of variations from light-off to light-on that occur during a plurality of sampling operations Td1 in one state detection operation (AC flashing detection operation) Tb1, for example. In the present embodiment, the signal lamp 3 is determined to be in the flashing state if the total number of variations from light-on to light-off and variations from light-off to light-on is two or more. That is, the signal lamp 3 is determined to be in the flashing state if the number of variations from light-on to light-off is one or more and the number of variations from light-off to light-on is one or more.

The number (five) of sampling operations Td1 in one state detection operation (AC flashing detection operation) Tb1 and the time (2 s) of one state detection operation (AC flashing detection operation) Tb1 are set in accordance with the method of determining a flashing state.

The determination as to whether the signal lamp 3 is in the continuous light-on state is made on the basis of the number of repetitions of light-on that occur during a plurality of sampling operations Td1 in one state detection operation (AC flashing detection operation) Tb1, for example. In the present embodiment, the signal lamp 3 is determined to be in the continuous light-on state in the case where the number of repetitions of light-on is four or more.

The determination as to whether the signal lamp 3 is in the continuous light-off state is made on the basis of the number of repetitions of light-off that occur during a plurality of sampling operations Td1 in one state detection operation (AC flashing detection operation) Tb1, for example. In the present embodiment, the signal lamp 3 is determined to be in the continuous light-off state in the case where the number of repetitions of light-off is four or more. In the case where none of the three determination conditions described above is met, the previous value is held.

In the AC flashing detection mode A, the state detection operation (AC flashing detection operation) Tb1 is cyclically repeated a plurality of times consecutively. That is, in the AC flashing detection mode A, second cyclic operation Ta constituted of the state detection operation (AC flashing detection operation) Tb1 and second quiescent operation Tb2 performed subsequent to the state detection operation (AC flashing detection operation) Tb1 is executed. The second quiescent operation Tb2 has a time that is longer than that of the first quiescent operation Td2. In the second quiescent operation Tb2, the controller 51 enters a power-saving mode. In the second quiescent operation Tb2, the controller 51 enters a so-called sleep mode or hibernation mode, which reduces power consumption by the controller 51.

The time of the second cyclic operation Ta is set to a time that enables execution of the power-saving mode in the second quiescent operation Tb2 while considering the cycle in which it is desired to acquire light emission information on the processing facility 2. The second cyclic operation Ta is set to 10 s, for example. The time of the second cyclic operation Ta is set in accordance with the time which elapses since the time of the sampling operation Td1 which is executed after the second quiescent operation Tb2, for example.

That is, in the AC flashing detection mode A, the sensors 41a, 41b, and 41c acquire light emission information for determining which of the continuous light-on state, the flashing state, and the continuous light-off state the signal lamp 3 is in every 10 s in the case where AC power is supplied to the signal lamp 3.

Next, the AC light-on detection mode B will be described in detail with reference to FIG. 6. In the AC light-on detection mode B, as illustrated in FIG. 6, the second cyclic operation Ta which is constituted of the state detection operation Tb1 (hereinafter referred to also as "AC light-on detection operation") for the signal lamp 3 and the second quiescent operation Tb2 which is performed subsequent to the state detection operation (AC light-on detection operation) Tb1 is executed. That is, in the AC light-on detection mode B, as in the AC flashing detection mode A, the state detection operation (AC light-on detection operation) Tb1 is cyclically repeated a plurality of times consecutively. One second cyclic operation Ta in the AC light-on detection mode B is set to 10 s, for example, as in the AC flashing detection mode A.

It should be noted, however, that only one sampling operation Td1 is performed in the state detection operation (AC light-on detection operation) Tb1, unlike the AC flashing detection mode A. Thus, the time of one state detection operation (AC light-on detection operation) Tb1 is equal to the time of one sampling operation Td1.

In one sampling operation Td1 in the AC light-on detection mode B, as in one sampling operation Td1 in the AC flashing detection mode A, a plurality of sampling processes P are executed.

That is, the signal lamp 3 is determined to be in the continuous light-on state if it is determined that the signal lamp 3 is lit on in one sampling operation Td1. On the other hand, the signal lamp 3 is determined to be in the continuous light-off state if it is determined that the signal lamp 3 is lit off in one sampling operation Td1. In the AC light-on detection mode B, the signal lamp 3 cannot be determined to be in the flashing state.

Thus, in the AC light-on detection mode B, the sensors 41a, 41b, and 41c acquire light emission information for determining which of the continuous light-on state and the continuous light-off state the signal lamp 3 is in every 10 s in the case where AC power is supplied to the signal lamp 3. In the AC light-on detection mode B, only ten sampling processes P executed in one sampling operation Td1 are executed during one second cyclic operation Ta for 10 s. Thus, in the AC light-on detection mode B, the time in the sleep mode or the hibernation mode is longer than that in the AC flashing detection mode A, which reduces more power consumption by the controller 51.

Next, the DC flashing detection mode C will be described in detail with reference to FIG. 7. In the DC flashing detection mode C, as illustrated in FIG. 7, the second cyclic operation Ta which is constituted of the state detection operation Tb1 (hereinafter referred to also as "DC flashing detection operation") for the signal lamp 3 and the second quiescent operation Tb2 which is performed subsequent to the state detection operation (DC flashing detection operation) Tb1 is executed. That is, in the DC flashing detection mode C, as in the AC flashing detection mode A, the state detection operation (DC flashing detection operation) Tb1 is cyclically repeated a plurality of times consecutively. One second cyclic operation Ta in the DC flashing detection mode C is set to 10 s, for example, as in the AC flashing detection mode A.

The state detection operation (DC flashing detection operation) Tb1 has the first cyclic operation Tc which is constituted of the sampling operation Td1 and the first quiescent operation Td2, the first cyclic operation Tc being repeated a plurality of times consecutively.

It should be noted, however, that only one sampling process P is executed in one sampling operation Td1 in the DC flashing detection mode C. That is, one sampling operation Td1 is equal to the sampling time Ts for one sampling process P. Unlike AC power, DC power is not varied over time, and therefore a detection value of the light emission information in the DC detection mode is not fluctuated, unlike a detection value in an AC detection mode that is fluctuated in accordance with fluctuations in AC power.

Therefore, it is enough to acquire a detection value of the light emission information in one sampling process P in one sampling operation Td1.

That is, in the DC flashing detection mode C, the sensors 41a, 41b, and 41c acquire light emission information for determining which of the continuous light-on state, the flashing state, and the continuous light-off state the signal lamp 3 is in every 10 s in the case where DC power is supplied to the signal lamp 3. In the DC flashing detection mode C, a plurality of sampling operations Td1 are executed during one second cyclic operation Ta for 10 s, but only one sampling process P is executed in one sampling operation Td1. Thus, in the DC flashing detection mode C, the time in the sleep mode or the hibernation mode is longer than that in the AC flashing detection mode A, which reduces more power consumption by the controller 51.

Next, the DC light-on detection mode D will be described in detail with reference to FIG. 8. In the DC light-on detection mode D, as illustrated in FIG. 8, the second cyclic operation Ta which is constituted of the state detection operation Tb1 (hereinafter referred to also as "DC light-on detection operation") for the signal lamp 3 and the second quiescent operation Tb2 which is performed subsequent to the state detection operation (DC light-on detection operation) Tb1 is executed. That is, in the DC light-on detection mode D, as in the DC flashing detection mode C, the state detection operation (DC light-on detection operation) Tb1 is cyclically repeated a plurality of times consecutively. One second cyclic operation Ta in the DC light-on detection mode D is set to 10 s, for example, as in the DC flashing detection mode C.

It should be noted, however, that only one sampling operation Td1 is performed in the state detection operation (DC light-on detection operation) Tb1, unlike the DC flashing detection mode C. Further, only one sampling process P is executed in one sampling operation Td1. Thus, the time of one state detection operation (DC light-on detection operation) Tb1 is equal to the time of one sampling operation Td1, and equal to the sampling time Ts for one sampling process P.

That is, in the DC light-on detection mode D, the sensors 41a, 41b, and 41c acquire light emission information for determining which of the continuous light-on state and the continuous light-off state the signal lamp 3 is in every 10 s in the case where DC power is supplied to the signal lamp 3. In the DC light-on detection mode D, only one sampling process P is executed during one second cyclic operation Ta for 10 s. Thus, in the DC light-on detection mode D, the time in the sleep mode or the hibernation mode is longer than that in the other modes A, B, and C, which further reduces power consumption by the controller 51.

Next, the information acquisition device 4 and the management device 5 will be described with reference to FIG. 4 again. The acquisition section 61 of the information acquisition device 4 includes a flashing detection operation execution section 61a and a light-on detection operation execution section 61b. The flashing detection operation execution section 61a executes the AC flashing detection operation Tb1 in the AC flashing detection mode A illustrated in FIG. 5 and the DC flashing detection operation Tb1 in the DC flashing detection mode C illustrated in FIG. 7. That is, the flashing detection operation execution section 61a acquires light emission information for determining which of the continuous light-on state, the flashing state, and the continuous light-off state the signal lamp 3 is in.

The light-on detection operation execution section 61b executes the AC light-on detection operation Tb1 in the AC light-on detection mode B illustrated in FIG. 6 and the DC light-on detection operation Tb1 in the DC light-on detection mode D illustrated in FIG. 8. That is, the light-on detection operation execution section 61b acquires light emission information for determining which of the continuous light-on state and the continuous light-off state the signal lamp 3 is in.

The continuation processing section 62 causes the acquisition section 61 to cyclically execute the state detection operation Tb1 in each of the modes A to D illustrated in FIGS. 5 to 8, respectively. That is, the continuation processing section 62 instructs the acquisition section 61 to repeat the second cyclic operation Ta illustrated in FIGS. 5 to 8 a plurality of times consecutively.

The transmission processing section 63 performs control for the transmission device 56 to wirelessly transmit the light emission information which is acquired by the acquisition section 61. The transmission processing section 63 controls wireless transmission when the controller 51 is not in the power-saving mode (sleep mode and hibernation mode). For example, the transmission processing section 63 performs one transmission process for each second cyclic operation Ta performed by the acquisition section 61. The transmission processing section 63 may transmit all the acquired light emission information. It should be noted, however, that the transmission processing section 63 may transmit only the maximum value of the AC flashing detection operation Td1 (FIG. 5) and the AC light-on detection operation Td1 (FIG. 6) in the AC detection modes A and B.

The flashing necessity determination section 64 determines on the basis of the acquired light emission information whether or not the signal lamp 3 is brought into the flashing state in a predetermined period in the case where the flashing detection operation execution section 61a is executing the AC flashing detection operation (FIG. 5) or the DC flashing detection operation (FIG. 7). The worker or the manager can determine, as desired, the setting of the processing facility 2 so as to bring the signal lamp 3 into the flashing state, or so as not to bring the signal lamp 3 into the flashing state. That is, the signal lamp 3 is set so as to be possibly brought into the flashing state, or set so as not to be brought into the flashing state, in accordance with the setting of the processing facility 2 that is currently used.

In the modes A and C in which light emission information that enables determination of the flashing state is acquired, as illustrated in FIGS. 5 and 7, a plurality of state detection operations Tb1 are executed in one second cyclic operation Ta. In the modes B and D in which light emission information that does not enable determination of the flashing state is acquired, as illustrated in FIGS. 6 and 8, one state detection operation Tb1 is executed in one second cyclic operation Ta. That is, the amount of power consumption in the modes B and D is smaller than that in the modes A and C.

As discussed above, the signal lamp 3 indicates that the workpiece W has not been carried into the carry-in device 2a, which is positioned immediately before the processing facility 2, when the signal lamp 3 is flashed in red, for example. Among the plurality of processing facilities 2 in FIG. 1, only the first processing facility 2 in the conveyance direction of the workpiece W may be brought into the flashing state in red, but the other processing facilities 2 are not to be brought into the flashing state in red. It is assumed that none of the processing facilities 2 are to be brought into the flashing state in the other colors.

Thus, in the initial stage in which the processing facilities 2 are installed, only the first processing facility 2 in the conveyance direction may be brought into the flashing state, and the other processing facilities 2 are not to be brought into the flashing state. That is, it is only necessary that the signal lamp 3 of the first processing facility 2 in the conveyance direction can be determined to be in the flashing state.

Figure 9:
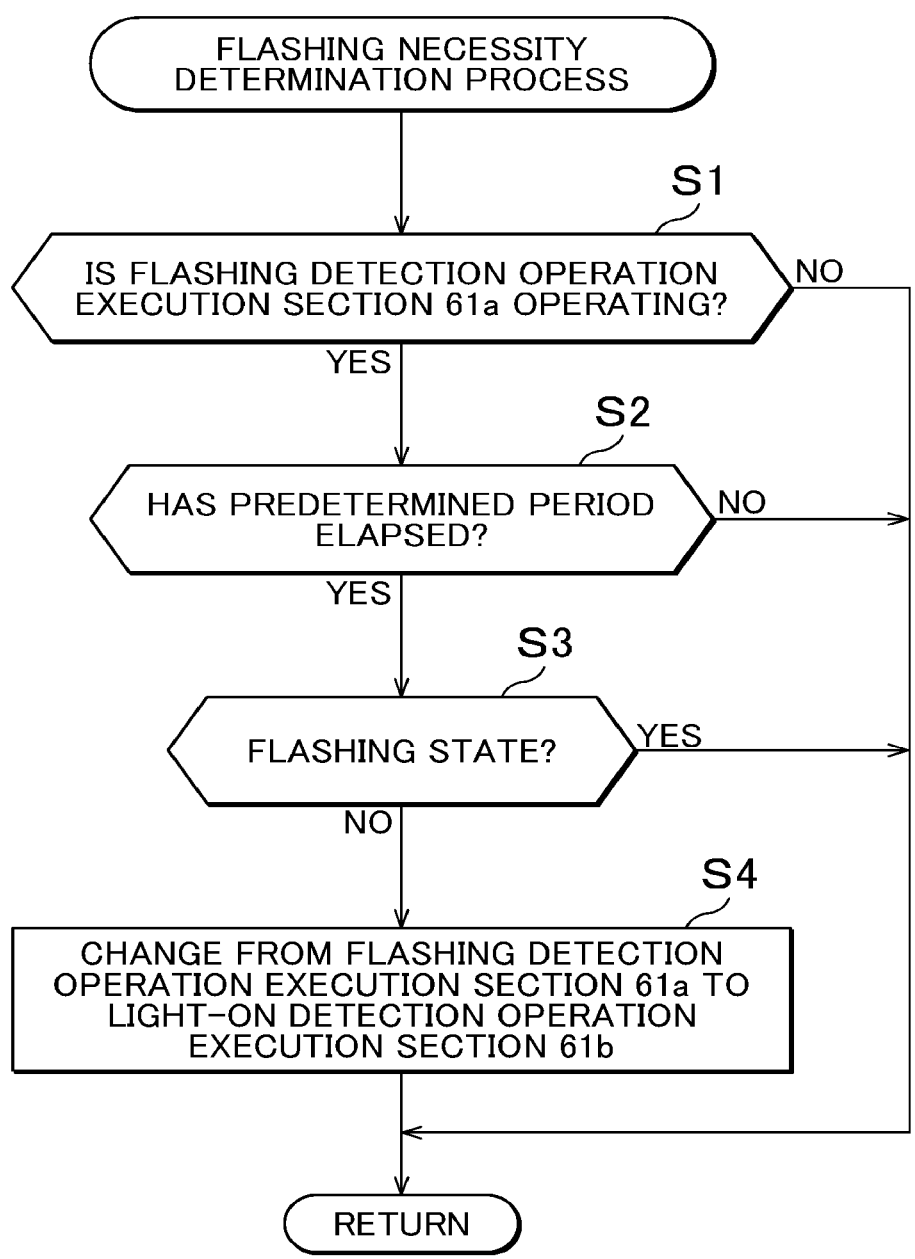
FIG. 9 is a flowchart illustrating a process performed by a flashing necessity determination section.

Thus, the flashing necessity determination section 64 executes a process illustrated in FIG. 9. That is, the flashing necessity determination section 64 determines whether or not the flashing detection operation execution section 61a is operating, that is, light emission information is acquired through the AC flashing detection operation or the DC flashing detection operation (S1). If the flashing detection operation execution section 61a is not operating (S1: No), the process is returned.

If the flashing detection operation execution section 61a is operating (S1: Yes), the flashing necessity determination section 64 determines whether or not a predetermined period (e.g. one month) has elapsed since the time when the controller 51 is first turned on (S2). If the predetermined period has not elapsed (S2: No), the process is returned.

If the predetermined period has elapsed (S2: Yes), the flashing necessity determination section 64 determines, on the basis of the light emission information which is acquired in the AC flashing detection operation (FIG. 5) or the DC flashing detection operation (FIG. 7), whether or not the signal lamp 3 is brought into the flashing state in the predetermined period (S3).

In the case where it is determined that the signal lamp 3 is brought into the flashing state (S3: Yes), the process is returned. That is, in this case, the flashing necessity determination section 64 causes the flashing detection operation execution section 61a to continuously execute the AC flashing detection operation or the DC flashing detection operation.

In the case where it is determined that the signal lamp 3 is not brought into the flashing state (S3: No), the flashing necessity determination section 64 causes the acquisition section 61 to change from the AC flashing detection operation Tb1 (FIG. 5) or the DC flashing detection operation Tb1 (FIG. 7) to the AC light-on detection operation Tb1 (FIG. 6) or the DC light-on detection operation Tb1 (FIG. 8) (S4). That is, the flashing necessity determination section 64 causes the flashing detection operation execution section 61a to stop execution of the AC flashing detection operation Tb1 (FIG. 5) or the DC flashing detection operation Tb1 (FIG. 7), and causes the light-on detection operation execution section 61b to execute the AC light-on detection operation Tb1 (FIG. 6) or the DC light-on detection operation Tb1 (FIG. 8). Further, the flashing necessity determination section 64 causes the continuation processing section 62 to execute the second cyclic operation Ta with the AC flashing detection operation Tb1 (FIG. 5) or the DC flashing detection operation Tb1 (FIG. 7), which is performed by the flashing detection operation execution section 61a, replaced with the AC light-on detection operation Tb1 (FIG. 6) or the DC light-on detection operation Tb1 (FIG. 8), which is performed by the light-on detection operation execution section 61b. After that, the process is returned.

In this way, in the case where the processing facility 2 is not brought into the flashing state, the flashing necessity determination section 64 automatically causes the acquisition section 61 to acquire light emission information that does not allow determination of the flashing state of the signal lamp 3 corresponding to the processing facility 2.

The power type determination section 65 determines on the basis of the acquired light emission information whether power supplied to the signal lamp 3 is AC or DC in a predetermined period in the case where the AC flashing detection operation Tb1 (FIG. 5) or the AC light-on detection operation Tb1 (FIG. 6) is executed. In the case where it is determined that DC power is supplied to the signal lamp 3, the power type determination section 65 switches to execution of the DC flashing detection operation Tb1 (FIG. 7) or the DC light-on detection operation Tb1 (FIG. 8).

In the AC detection modes A and B, as illustrated in FIGS. 5 and 6, a plurality of sampling processes P are executed in one sampling operation Td1. On the other hand, in the DC detection modes C and D, as illustrated in FIGS. 7 and 8, only one sampling process P is executed in one sampling operation Td1. That is, the amount of power consumption in the DC detection modes C and D is smaller than that in the AC detection modes A and B.

Figure 10:
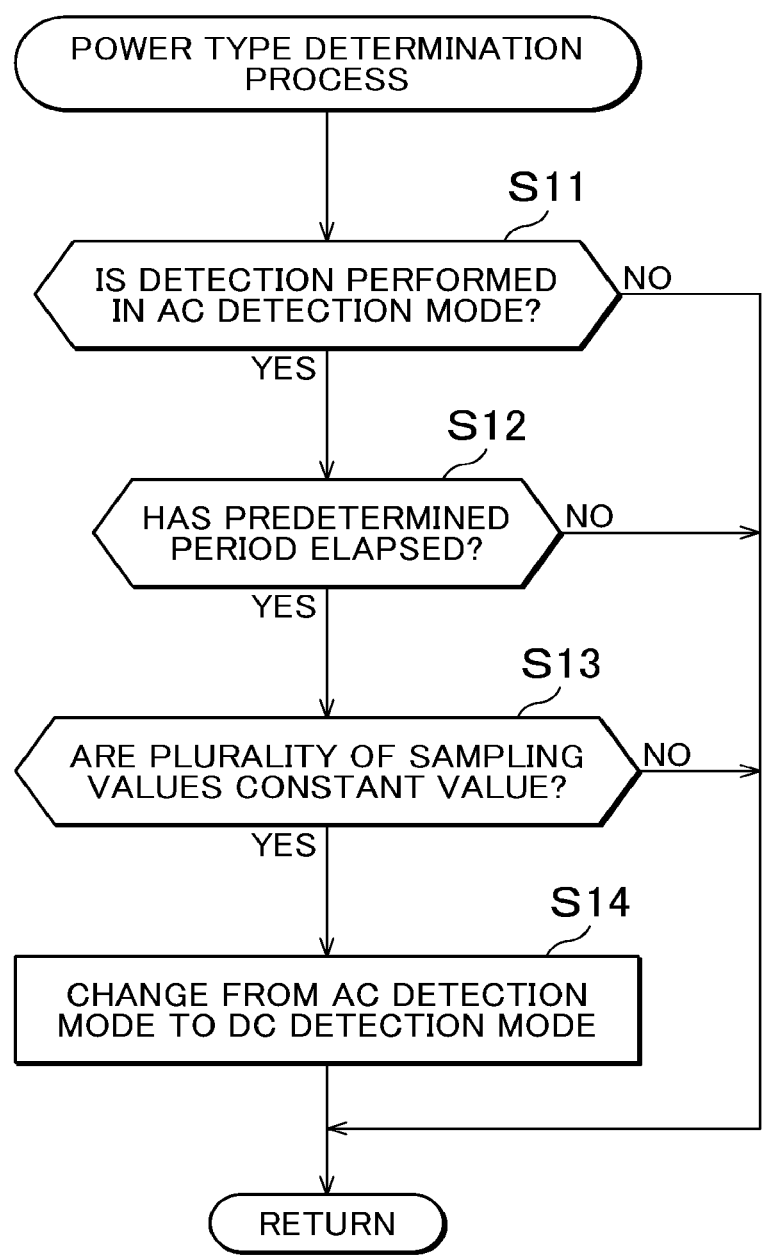
FIG. 10 is a flowchart illustrating a process performed by a power type determination section.

Thus, the power type determination section 65 executes a process illustrated in FIG. 10. That is, the power type determination section 65 determines whether detection is performed in the AC detection mode, that is, light emission information is acquired through the AC flashing detection operation Tb1 (FIG. 5) or the AC light-on detection operation Tb1 (FIG. 6) (S11). If detection is not performed in the AC detection mode (S11: No), detection is already performed in the DC detection mode, and therefore the process is returned.

If detection is performed in the AC detection mode (S11: Yes), the power type determination section 65 determines whether or not a predetermined period (e.g. one month) has elapsed since the time when the controller 51 is first turned on (S12). If the predetermined period has not elapsed (S12: No), the process is returned.

If the predetermined period has elapsed (S12: Yes), the power type determination section 65 determines whether or not a plurality of sampling values acquired in a plurality of sampling processes P in one sampling operation Td1 are a constant value (S13). If the sampling values are not a constant value (S13: No), the power type determination section 65 determines that AC power is supplied to the signal lamp 3, and maintains the AC detection mode.

If the sampling values are a constant value (S13: Yes), on the other hand, the power type determination section 65 determines that DC power is supplied to the signal lamp 3, and changes from the AC detection mode to the DC detection mode (S14). That is, the power type determination section 65 performs one sampling process P, rather than a plurality of sampling processes P, in one sampling operation Td1. After that, the process is returned.

In this way, in the case where DC power is supplied to the signal lamp 3, the power type determination section 65 automatically causes the acquisition section 61 to acquire light emission information that does not consider fluctuations in AC power in determination of the signal lamp 3 corresponding to the processing facility 2.

Figure 4:
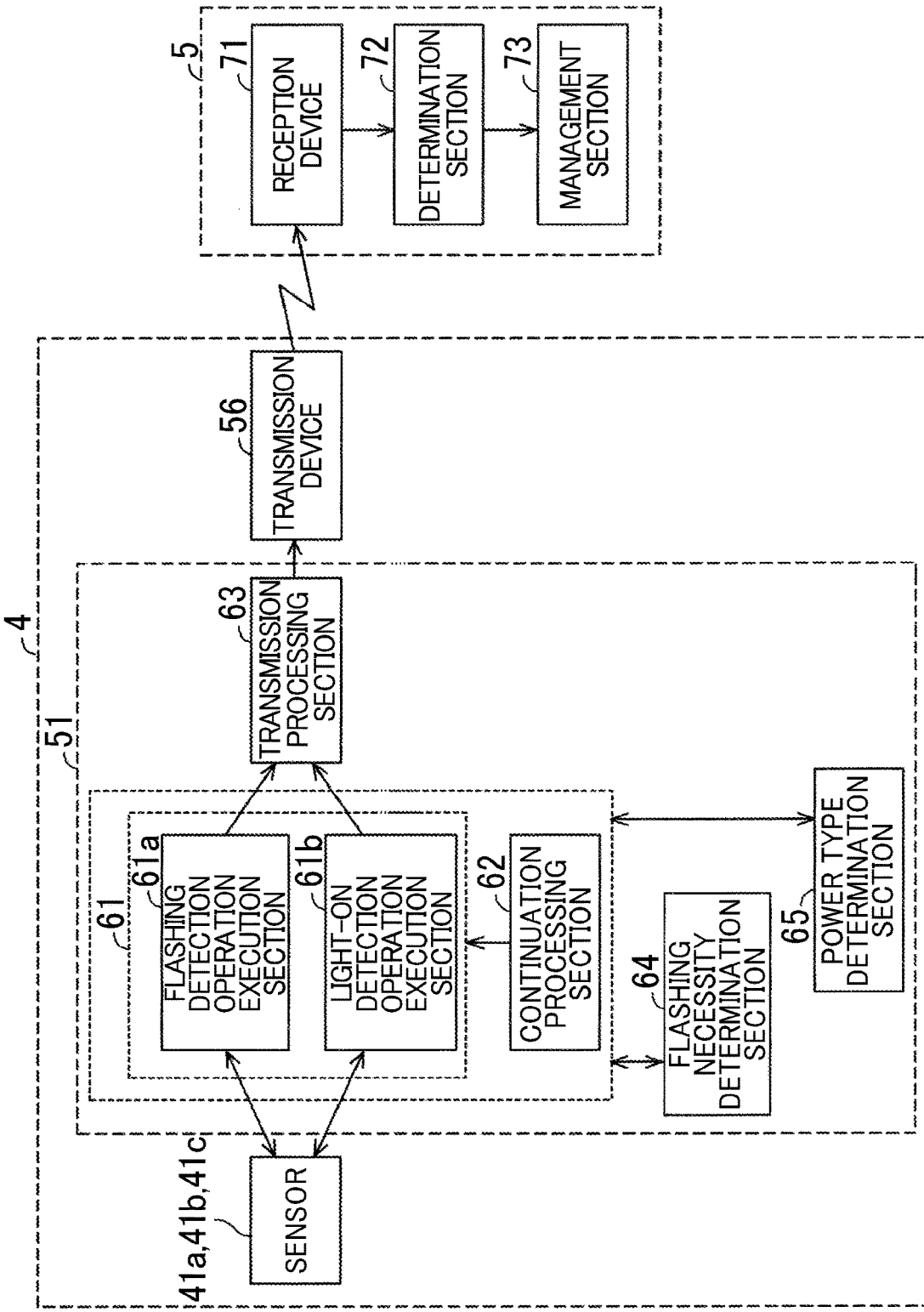
FIG. 4 is a functional block diagram of an information acquisition device and a management device according to a first embodiment.

As illustrated in FIG. 4, the management device 5 includes a reception device 71, a determination section 72, and a management section 73. The reception device 71 wirelessly receives the light emission information which is transmitted from the transmission device 56 of the information acquisition device 4.

The determination section 72 determines, on the basis of the light emission information which is received by the reception device 71, which of the continuous light-on state, the flashing state, and the continuous light-off state the corresponding signal lamp 3 is in. That is, the determination section 72 determines, on the basis of the light emission information which is acquired in the state detection operation (AC flashing detection operation) Tb1 in the AC flashing detection mode A, which of the continuous light-on state, the flashing state, and the continuous light-off state the signal lamp 3 is in.

The determination section 72 also determines, on the basis of the light emission information which is acquired in the state detection operation (AC light-on detection operation) Tb1 in the AC light-on detection mode B, which of the continuous light-on state and the continuous light-off state the signal lamp 3 is in. The determination section 72 determines, on the basis of the light emission information which is acquired in the state detection operation (DC flashing detection operation) Tb1 in the DC flashing detection mode C, which of the continuous light-on state, the flashing state, and the continuous light-off state the signal lamp 3 is in. The determination section 72 determines, on the basis of the light emission information which is acquired in the state detection operation (DC light-on detection operation) Tb1 in the DC light-on detection mode D, which of the continuous light-on state and the continuous light-off state the signal lamp 3 is in.

The method of determining each state in each mode is as discussed above. With the continuation processing section 62 cyclically executing the second cyclic operation Ta in each mode, the determination section 72 cyclically determines the state of the signal lamp 3.

The management section 73 manages the state of the plurality of processing facilities 2 on the basis of the state of the signal lamp 3 which is determined by the determination section 72. For example, with the management section 73 displaying the state of the plurality of processing facilities 2 on a display screen in a color-coded manner, the worker and the manager can easily grasp the state of the plurality of processing facilities 2. In the case where the processing facility 2 is in an abnormal state, requires maintenance, or is standing by for the workpiece W to be carried in, the management section 73 can transfer such information to the worker or the manager.

With the facility management system 1, in order to determine a flashing state, the sampling operation Td1 to acquire light emission information is not performed consecutively, but the first cyclic operation Tc which is constituted of the predetermined sampling operation Td1 and the first quiescent operation Td2 is performed a plurality of times. That is, a flashing state can be determined through the plurality of sampling operations Td1 in the first cyclic operation Tc. The first cyclic operation Tc includes the first quiescent operation Td2. That is, the amount of power consumption can be reduced for the first quiescent operation Td2 compared to a case where the sampling operation Td1 is performed consecutively as in the related art.

In the AC flashing detection mode A and the DC flashing detection mode C, further, the second quiescent operation Tb2 is performed after the first cyclic operation Tc is performed a plurality of times consecutively. That is, a flashing state is not determined at all times, but is determined intermittently with the second quiescent operation Tb2 interposed therebetween. Further, the second quiescent operation Tb2 is longer than the first quiescent operation Td2. Thus, the amount of power consumption can be further reduced for the second quiescent operation Tb2. In particular, the controller 51 can be caused to enter the power-saving mode in the first quiescent operation Td2 and the second quiescent operation Tb2. As a result, the amount of power consumption by the controller 51 is further reduced.

An information acquisition device 4 and a management device 5 according to a second embodiment will be described with reference to FIG. 11. Blocks according to the second embodiment that have substantially the same function as that of blocks according to the first embodiment are given the same reference numerals.

In the first embodiment, the information acquisition device 4 transmits light emission information to the management device 5, and the management device 5 determines which of the continuous light-on state, the flashing state, and the continuous light-off state the signal lamp 3 is in. The flashing necessity determination section 64 of the information acquisition device 4 determines whether or not the signal lamp 3 is in the flashing state.

In the second embodiment, the information acquisition device 4 determines which of the continuous light-on state, the flashing state, and the continuous light-off state the signal lamp 3 is in, and wirelessly transmits state information on the signal lamp 3 as the determination result to the management device 5. The management device 5 manages the processing facilities 2 on the basis of the state information on the signal lamp 3 which is wirelessly received.

Figure 11:
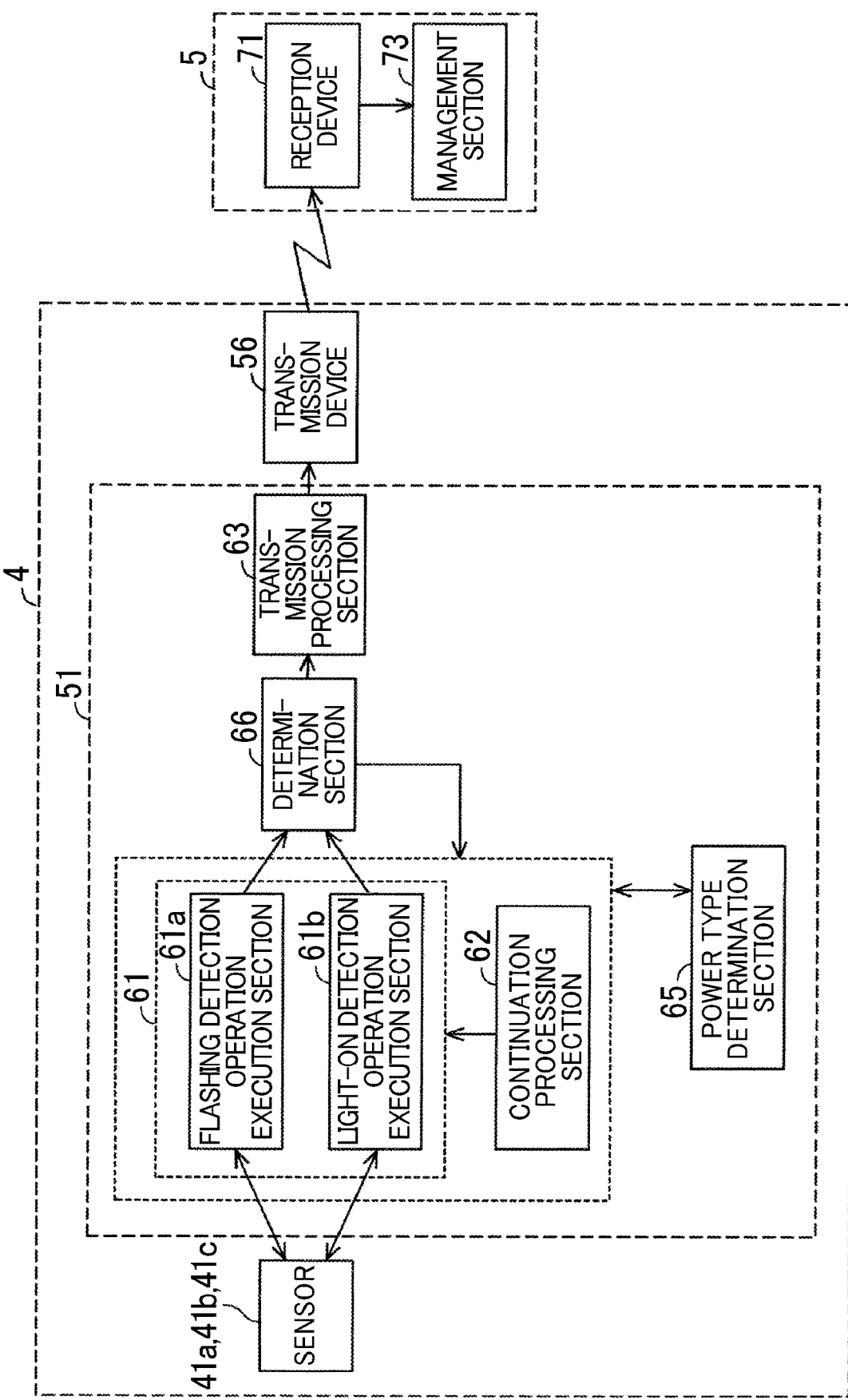
FIG. 11 is a functional block diagram of an information acquisition device and a management device according to a second embodiment.

In particular, as illustrated in FIG. 11, the controller 51 of the information acquisition device 4 includes an acquisition section 61, a continuation processing section 62, a determination section 66, a transmission processing section 63, and a power type determination section 65. The management device 5 includes a reception device 71 and a management section 73.

The acquisition section 61 and the continuation processing section 62 are the same as those according to the first embodiment. The determination section 66 performs a process that is the same as the process of the determination section 72 of the management device 5 and the process (process in FIG. 10) of the flashing necessity determination section 64 of the information acquisition device 4 according to the first embodiment. That is, the determination section 66 determines, on the basis of the light emission information which is acquired by the acquisition section 61, which of the continuous light-on state, the flashing state, and the continuous light-off state the signal lamp 3 is in. In the case where the signal lamp 3 is not brought into the flashing state in a predetermined period, as illustrated in FIG. 10, the determination section 66 changes from the AC flashing detection mode A or the DC flashing detection mode C to the AC light-on detection mode B or the DC light-on detection mode D.

The transmission processing section 63 performs control for the transmission device 56 to wirelessly transmit the state information on the signal lamp 3 as the result of the determination which is made by the determination section 66. The transmission device 56 wirelessly transmits the state information on the signal lamp 3, that is, information on the result of the determination as to which of the continuous light-on state, the flashing state, and the continuous light-off state the signal lamp 3 is in. The power type determination section 65 performs the same process as that according to the first embodiment.

The reception device 71 of the management device 5 wirelessly receives the state information on the signal lamp 3 which is transmitted by the transmission device 56 of the information acquisition device 4. The management section 73 manages the state of the processing facilities 2 on the basis of the state information on the signal lamp 3 which is received by the reception device 71. Also in the second embodiment, the same effect as that of the first embodiment is achieved.

What is claimed is:

1. A facility management system comprising:
a processing facility;
a signal lamp configured to indicate information on the processing facility;
an information acquisition device that is attached to the signal lamp and is configured to acquire light emission information on the signal lamp and wirelessly transmit the light emission information; and
a terminal configured to wirelessly receive the light emission information which is transmitted by the information acquisition device, determine, on the basis of the light emission information, which of a continuous light-on state, a flashing state, and a continuous light-off state the signal lamp is in, and manage a state of the processing facility, wherein:
the information acquisition device includes a sensor configured to acquire the light emission information and a controller configured to control the sensor;
the controller is configured to:
execute a flashing detection operation in which a first cyclic operation is repeatedly performed a plurality of times consecutively, the first cyclic operation being defined as an operation constituted of a predetermined sampling operation to acquire the light emission information through the sensor and a first quiescent operation performed subsequent to the sampling operation and having a cycle corresponding to a flashing cycle of the signal lamp, and
repeat a second cyclic operation a plurality of times consecutively, the second cyclic operation being defined as an operation constituted of the flashing detection operation and a second quiescent operation performed subsequent to the flashing detection operation and having a time that is longer than a time of the first quiescent operation; and
the terminal is configured to:
determine, on the basis of the light emission information which is acquired in each flashing detection operation, whether or not the signal lamp is in the flashing state, and
cyclically determine whether or not the signal lamp is in the flashing state with the controller cyclically executing the second cyclic operation.

2. The facility management system according to claim 1, wherein the sampling operation is an operation which has a time corresponding to half a cycle of alternating current power which is supplied to the signal lamp and in which a plurality of sampling processes are performed in the time.

3. The facility management system according to claim 1, wherein the terminal is configured to make a determination as to whether or not the signal lamp is in the flashing state on the basis of a number of variations from light-on to light-off and a number of variations from light-off to light-on that occur during a plurality of sampling operations in one flashing detection operation.

4. The facility management system according to claim 3, wherein the terminal is configured to make a determination as to whether or not the signal lamp is in the continuous light-on state on the basis of a number of repetitions of light-on that occur during the plurality of sampling operations in the one flashing detection operation.

5. The facility management system according to claim 3, wherein the terminal is configured to make a determination as to whether or not the signal lamp is in the continuous light-off state on the basis of a number of repetitions of light-off during the plurality of sampling operations in the one flashing detection operation.

6. The facility management system according to claim 1, wherein
the signal lamp is set so as to be brought into the flashing state or set so as not to be brought into the flashing state in accordance with setting of the processing facility; and
the controller is configured to:
determine, on the basis of the light emission information which is acquired in the flashing detection operation, whether or not the signal lamp is brought into the flashing state in a predetermined period,
cause the flashing detection operation execution section to continue execution of the flashing detection operation in a case where it is determined that the signal lamp is brought into the flashing state, and
cause the flashing detection operation execution section to stop execution of the flashing detection operation in a case where it is determined that the signal lamp is not brought into the flashing state.

7. The facility management system according to claim 6, wherein the controller is configured to:
execute a light-on detection operation in which the sampling operation is not repeated a plurality of times but the sampling operation is performed only once in one second cyclic operation; and
in the case where it is determined that the signal lamp is not brought into the flashing state:
stop execution of the flashing detection operation, and
execute the light-on detection operation to replace the flashing detection operation with the light-on detection operation.

8. The facility management system according to claim 2, wherein
the signal lamp is supplied with one of alternating current power and direct current power in accordance with a manner of use; and
in a case where a plurality of sampling values acquired in a plurality of sampling processes in one sampling operation are a constant value in a predetermined period, the controller is configured to determine that the signal lamp is supplied with the direct current power, and perform one sampling process, rather than the plurality of sampling processes, in one sampling operation.

9. A facility management system comprising:
a processing facility;
a signal lamp configured to indicate information on the processing facility;
an information acquisition device that is attached to the signal lamp and is configured to acquire light emission information on the signal lamp,
determine, on the basis of the light emission information, which of a continuous light-on state, a flashing state, and a continuous light-off state the signal lamp is in, and wirelessly transmit state information on the signal lamp; and
a terminal configured to wirelessly receive the state information which is transmitted by the information acquisition device and manage a state of the processing facility, wherein:
the information acquisition device includes a sensor configured to acquire the light emission information and a controller configured to control the sensor; and
the controller is configured to:
execute a flashing detection operation in which a first cyclic operation is repeatedly performed a plurality of times consecutively, the first cyclic operation being defined as an operation constituted of a predetermined sampling operation to acquire the light emission information through the sensor and a first quiescent operation performed subsequent to the sampling operation and having a cycle corresponding to a flashing cycle of the signal lamp,
repeat a second cyclic operation a plurality of times consecutively, the second cyclic operation being defined as an operation constituted of the flashing detection operation and a second quiescent operation performed subsequent to the flashing detection operation and having a time that is longer than a time of the first quiescent operation,
determine, on the basis of the light emission information which is acquired in each flashing detection operation, whether or not the signal lamp is in the flashing state, and
cyclically determine whether or not the signal lamp is in the flashing state with cyclically executing the second cyclic operation.

* * * * *